United States Patent Office 3,535,156
Patented Oct. 20, 1970

3,535,156
METHOD OF EMPLOYING AQUEOUS FLUORO-CARBON CONCENTRATES IN CHLORINATED SOLVENT APPLICATION TO TEXTILES
Robert B. Turner, Lake Jackson, Tex., assignor to The Dow Chemical Company, Midland, Mich., a corporation of Delaware
No Drawing. Filed Dec. 11, 1967, Ser. No. 689,322
Int. Cl. B32b 27/04; B44d 1/09
U.S. Cl. 117—161                                    2 Claims

ABSTRACT OF THE DISCLOSURE

The present invention comprises incorporating an aqueous emulsion or suspension of fluorocarbon stain and oil repellent into a chlorinated solvent using a lower alcohol and a glycol ether to maintain the fluorocarbon in the chlorinated solvent, applying the so-prepared chemicals to a textile material, and drying said textile material, in a manner to retain the fluorocarbon on said textile to impart oil repellency to said fabric.

BACKGROUND OF INVENTION

For several years, the textile and fabric industry has been treating material with fluorocarbon based stain and oil repellents such as, for example, Scotchgard (a proprietary product of 3M Company), Zepel (a proprietary product of the E. I. du Pont de Nemours Company). The early fluorocarbon based repellent chemicals were applied from aqueous emulsions, or dispersions. Recently, an apparatus and method for treating, among other things, textiles and fabrics with chemicals from solvent solutions has gained acceptance in the industry. The manufacturers of the treating chemicals have either modified their products or designed new products which are more compatible with the solvent systems of the new methods and useful in the new apparatus. These new compositions are expensive. It would, therefore, be advantageous if one could employ a cheaper source of fluorocarbon and obtain equivalent repellency.

BRIEF SUMMARY OF INVENTION

In accordance with the present invention, a fluorocarbon such as described in U.S. Pats. 2,841,573; 3,147,065; 3,147,066; 3,188,340; 3,198,754; 3,248,260; 3,256,230; 3,256,231; and 3,282,905; for example, in emulsified or dispersed systems as commercially available, are mixed with a chlorinated hydrocarbon to provide from 0.05 to 5% by weight of resin solids. This is accomplished by adding from 5 to 20% by weight of a mixture consisting of 30 to 70% by weight of a lower alkanol and from 70 to 30% by weight of a glycol ether to the chlorinated solvent-fluorocarbon mixture. The resulting suspension or emulsion can be designed to contain from 0.8 to 28% by weight of fluorocarbon emulsion system in the chlorinated hydrocarbon. The resulting mixture is applied to the textile material by padding, spraying or brushing the mixture onto the fabric. The so-wetted fabric is dried.

The fluorocarbons are generally available in acqueous systems of the following composition:

10–38% by weight fluorocarbon solids
10–30% by weight organic ketone
4–20% by weight organic glycol
balance water plus small percentage surface active agent.

The surprising part of the present invention is that a fluorocarbon specifically designed by the manufacturer and specifically incorporated into a concentrate form for use with water application can be put into a useful form in a chlorinated solvent, applied to textiles and impart the oil and stain repellency at least equal to that obtained using the concentrate as designed by the manufacturer.

The lower alkanols and glycol ethers which have been found useful are the lower alkanols having from 1 to 4 carbon atoms and the mono lower alkyl ether of alkylene glycols, said glycol being a $C_1$ to $C_4$ alkyl ether of a $C_2$ to $C_4$ alkylene glycol. Exemplary of these materials are methanol, ethanol, propanol, isopropanol, n-butanol, and isobutanol, methoxy ethanol, ethoxy ethanol, pentoxy propanol and ethoxy propanol.

Example 1

Five (5) cc. of an aqueous emulsion of a commercial stain repellent containing 28% by weight of an organic fluorocarbon resin (analyzed as containing predominantly 1,1,2-trichloro-1,2,2-trifluoroethane), 8% ethylene glycol, 12% acetone, and the balance water, was mixed with 50 cc. of 1,1,1-trichloroethane containing approximately 5% stabilizers. Thereafter 8 cc. of a mixture 70% by weight methyl alcohol and 30% by weight methoxypropanol was added with stirring. The resulting emulsion was employed to treat a cotton fabric by dipping the fabric into a 0.10% fluorocarbon in chlorinated solvent until there was attained a 300% wet pickup of the fluorocarbon. The so-treated fabric was dried and the standard test for oil and stain repellency run. The front of the fabric, the side to which the solution was applied, was found to have a satisfactory oil repellency rating.

Example 2

In another experiment, 8 cc. of 30% methyl alcohol and 70% methoxy propanol was added to 5 cc. of the fluorocarbon emulsion in 50 cc. of 1,1,1-trichloroethane. The resulting mixture was employed in the same amount as in Example 1 to treat cotton fabric. The treated fabric was dried, then tested for oil repellency and water repellency. The front side of the fabric exhibited a satisfactory rating.

Example 3

In another experiment, 8 cc. of a 50/50 mixture of methyl alcohol and methoxy propanol was added to a mixture of 5 cc. of fluorocarbon as received from the manufacturer and 50 cc. of 1,1,1-trichlorethane. The resulting emulsion was employed to treat a fabric, dried and then tested for oil repellency. The oil repellency of the fabric was satisfactory.

Example 4

In another series of experiments, either methyl alcohol or methoxy propanol was added to a mixture of 5 cc. of fluorocarbon and 10 cc. of 1,1,1-trichloroethane. When the methyl alcohol alone was added dropwise with stirring, the fluorocarbon precipitated from the mixture.

When the methoxy propanol alone was added, the 1,1,1-trichloroethane separated on standing as a cloudy layer.

I claim:
1. A method for treating fabrics with an organic fluorine compound to impart stain, water and oil resistance to said fabric which comprises:
    (I) mixing
        (A) 0.8 to 28 weight percent of an aqueous suspension or emulsion containing
            (1) 10 to 30% by weight acetone,
            (2) 4 to 20% by weight of a glycol,
            (3) 10 to 38% by weight of a water, stain, and oil repellent and organic fluorine compound selected from the group consisting of
                (a) vinyl esters and alkyl esters of perfluoroalkanesulfonamido alkylenemonocarboxylic acids,
                (b) quaternized perfluoroalkyl N-halomethyl carboxylic amides,

(c) quaternized perfluoroalkane sulfonamido N-halomethyl carboxylic amides,
(d) polyfluoroalkanamidoalkyl phosphates,
(e) aziridinyl derivatives of highly fluorinated organic monocarboxylic acids,
(f) interpolymers of N-methylol acrylamides with fluoroalkyl ester,
(g) polymers of a vinyl fluoro aliphatic compound and a vinyl compound,
(h) an ester having the formula

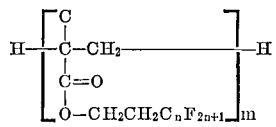

or polymer having the recurring unit

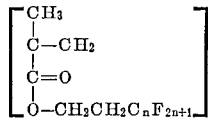

and
(4) the balance water, with (B) from 99.2 to 72% by weight of a mixture of
 (1) from 5 to 20% by weight of a mixture consisting of
  (a) 30 to 70% by weight of a lower alkanol having from 1 to 4 carbon atoms and
  (b) 70 to 30% by weight of a $C_1$ to $C_4$ alkyl ether of a $C_2$ to $C_4$ alkylene glycol,
 (2) in a chlorinated hydrocarbon solvent,
(II) applying
 said chlorinated solvent-organic fluorine compound containing mixture to the fabric, and
(III) drying the treated fabric.

2. The method of claim 1 wherein said lower alkanol is methyl alcohol and said glycol ether is methoxy propanol.

References Cited
UNITED STATES PATENTS 2,542,071   2/51   Sprung _____ 260—33.4
2,808,384   10/57  Gerbel et al. _____ 260—29.6

WILLIAM D. MARTIN, Primary Examiner

T. G. DAVIS, Assistant Examiner

U.S. Cl. X.R.

117—121, 135.5, 139.5